US008447646B2

(12) United States Patent
Thengvall et al.

(10) Patent No.: US 8,447,646 B2
(45) Date of Patent: May 21, 2013

(54) SYSTEM AND METHOD FOR RAPID GENERATION OF MINIMUM LENGTH PILOT TRAINING SCHEDULES

(75) Inventors: Benjamin Glover Thengvall, Austin, TX (US); Xiangtong Qi, Richardson, TX (US)

(73) Assignee: Accenture Global Services Limited, Dublin (IE)

( * ) Notice: Subject to any disclaimer, the term of this patent is extended or adjusted under 35 U.S.C. 154(b) by 1444 days.

(21) Appl. No.: 11/694,414

(22) Filed: Mar. 30, 2007

(65) Prior Publication Data

US 2007/0166692 A1 Jul. 19, 2007

Related U.S. Application Data

(62) Division of application No. 10/045,522, filed on Jan. 11, 2002, now Pat. No. 7,240,018.

(51) Int. Cl.
*G06Q 10/00* (2012.01)

(52) U.S. Cl.
USPC .................. 705/7.42; 705/7.38; 705/7.14

(58) Field of Classification Search
None
See application file for complete search history.

(56) References Cited

U.S. PATENT DOCUMENTS

| | | | |
|---|---|---|---|
| 4,797,839 A | 1/1989 | Powell | |
| 5,265,006 A | 11/1993 | Asthana et al. | |
| 5,450,317 A | 9/1995 | Lu et al. | |
| 5,794,224 A | 8/1998 | Yufik | |
| 6,064,981 A | 5/2000 | Barni et al. | |
| 6,076,067 A | 6/2000 | Jacobs et al. | |
| 6,078,912 A | 6/2000 | Buerger et al. | |
| 6,161,097 A | 12/2000 | Glass et al. | |
| 6,216,109 B1 * | 4/2001 | Zweben et al. | 705/7.12 |
| 6,240,362 B1 | 5/2001 | Gaspard | |
| 6,263,315 B1 | 7/2001 | Talluri | |
| 6,272,483 B1 * | 8/2001 | Joslin et al. | 706/62 |
| 6,275,767 B1 | 8/2001 | Delseny et al. | |
| 6,275,812 B1 | 8/2001 | Haq et al. | |
| 6,278,965 B1 | 8/2001 | Glass et al. | |
| 6,292,806 B1 | 9/2001 | Sandifer | |
| 6,651,046 B1 | 11/2003 | Sato et al. | |
| 6,704,692 B1 * | 3/2004 | Banerjee et al. | 702/189 |
| 7,240,018 B2 * | 7/2007 | Thengvall et al. | 705/7.37 |
| 7,346,528 B2 * | 3/2008 | Thengvall et al. | 705/7.21 |
| 2003/0139958 A1 * | 7/2003 | Thengvall et al. | 705/8 |
| 2005/0198636 A1 * | 9/2005 | Barsness et al. | 718/100 |
| 2005/0262305 A1 * | 11/2005 | Chow et al. | 711/133 |

FOREIGN PATENT DOCUMENTS

| | | |
|---|---|---|
| EP | 1072991 A2 | 1/2001 |
| WO | WO9207318 A1 | 4/1992 |
| WO | WO0067179 A2 | 11/2000 |

OTHER PUBLICATIONS

Kunzman, David S., Thesis: "Optimally Scheduling Instructors at the Defense Language Institute: An Integer Programming Approach.".*
Bard et al., "Decomposition Approach to the Inventory Routing Problem with Satellite Facilities," Transportation Science, 1998, 32:189-203.

(Continued)

*Primary Examiner* — David Rines
(74) *Attorney, Agent, or Firm* — Fish & Richardson P.C.

(57) ABSTRACT

A system for rapidly generating minimum length pilot training schedules which uses a branch and bound, and a mixed integer programming model with constraints to produce student and resource schedules at a device period level for all pilots of an airline.

12 Claims, 9 Drawing Sheets

OTHER PUBLICATIONS

Bard, "Class Scheduling for Pilot Training," Jun. 2001, pp. 1-37.

Bard, "Decomposition Approach to the Inventory Routing Problem with Satellite Facilities," Nov. 1996, pp. 1-29.

Haase et al., "Course Planning at Lufthansa Technical Training: Constructing More Profitable Schedules," Interfaces, Sep. 5-Oct. 1999, 29:95-109.

Hillier and Lieberman, "Introduction to Operations Research," McGraw-Hill, Inc., N.Y., 1995, pp. 87, 515-526.

Jarrah et al., "A Decision Support Framework for Airline Flight Cancellations and Delays," Transportation Science, Aug. 1993, 27:266-280.

Qi et al., "Class Scheduling for Pilot Training," Operations Research, Jan. 2004, (submitted for publication Jun. 2001) vol. 52(1):148-162.

Rakshit et al., "System Operations Advisor: A Real-Time Decision Support System for Managing Airline Operations at United Airlines," Interfaces, Mar. 2-Apr. 1996, 26:50-58.

Rittri et al., "Scheduling Pilot Training", presented at ILOG International Users Meeting, Oct. 2000.

Rushmeier, "Recent Advances in Exact Optimization of Airline Scheduling Problems," Jul. 1995, Operations Research Department USAir, 1995, pp. 1-38.

Verbeek, "Decision Support Systems—An Application in Strategic Manpower Planning of Airline Pilots," European Journal of Operational Research, 1991, 55:368-381.

Yu et al., "Optimized Pilot Planning and Training at Continental Airlines," Interfaces, Aug. 2004, 34(4):253-264.

U.S. Notice of Allowance for U.S. Appl. No. 10/045,522 dated Jan. 4, 2007 (7 pages).

* cited by examiner

SYSTEM AND METHOD FOR RAPID GENERATION OF MINIMUM LENGTH PILOT TRAINING SCHEDULES

RELATED APPLICATIONS

This is a divisional application of application Ser. No. 10/045,522, filed Jan. 11, 2002 now U.S. Pat. No. 7,240,018, the content of which is hereby incorporated by reference in its entirety.

FIELD OF THE INVENTION

The invention relates generally to systems and methods for generating schedules of events, and more particularly to the generation and optimization of training schedules for pilots to ensure that each pilot's training requirements are met in minimum length training schedules through the efficient use of training resources.

BACKGROUND OF THE INVENTION

Pilot staffing and training is one of the most complex and costly problems facing the major airlines. If not managed effectively, an airline cannot survive, not to mention profit, in the competitive air transportation market.

By way of example, Continental Airlines provides both domestic and international service to more than 100 destinations around the world. They operate 325 aircraft of nine different fleet types flying 1400 daily flights. Their 5000 pilots are stationed at three domestic and two international crew bases. At least twice a year, Continental conducts a system bid award. These awards provide an opportunity for pilots to use their seniority to increase their pay and improve their work schedules by changing their position (base, fleet, and seat), and provide a way for the airline to adjust staffing levels in response to retirements, attrition, and changes in their business plan. In an average system bid award, 15-20% of the airline's pilots receive new positions.

Prior to the deployment of the invention as described and claimed herein, Continental manpower planners with expert knowledge took more than two weeks to manually generate a single, partial, sub-optimal transition plan based on ensuring adequate staffing levels with no detailed consideration of costs. This manual solution did not include a training schedule. Planners would build the training schedule month by month using pen and paper to implement a training plan.

There is a wide variety of prior art which discloses both manual and computational solution methods for overcoming simple scheduling problems. None of the known prior art compares to this invention in scope or complexity. Some prior art, however, serves as basic building blocks for this invention. For example, branch and bound techniques are powerful tools used by operations research practitioners to solve difficult combinatorial problems. For a detailed description of branch and bound techniques, see pp. 515-526 of *Introduction to Operations Research*, by Frederick S. Hillier and Gerald J. Lieberman, McGraw-Hill, Inc., N.Y., 1995. The discussion includes an introductory example with a graphic illustrating a branch and bound tree. See also "Class Scheduling for Pilot Training" by Xiangtong Qi, Jonathan Bard, and Gang Yu, submitted for publication to Operations Research, June 2001, in which one of the inventors of the current invention disclosed part of the current invention, and the co-authors of the article provided a good overview of similar but not directly applicable prior art. In addition, "Scheduling Pilot Training", by Mikael Rittri and Goran Allerbo of Carmenta AB, presented at ILOG International Users Meeting, October 2000, describes a different solution strategy without mixed integer programming models or use of branch and bound techniques, and which fails to address contractual rules such as days off rules, and requirements for recurrent training.

The invention described and claimed herein has been developed as part of an integrated decision support system by CALEB Technologies Corp. of Austin, Tex., to face the training scheduling challenge. More particularly, the invention is required to schedule hundreds of pilots simultaneously for multiple different types of curriculum over a planning horizon of up to one year. Each training class has a variable start date, and the training schedules which are generated must conform to complex contractual and operational constraints. Schedules cannot be generated weekly or monthly and then repeated, due to the varying requirements for training over time. The invention minimizes pilot time spent in training, while maximizing training resource utilization. Large volumes of data are managed and state-of-the-art optimization modeling and solution techniques are employed to efficiently allocate human and training resources, and attain optimal operational and financial performance. The invention has recently been deployed at Continental Airlines, and has demonstrated remarkable savings with a positive effect on Continental's operations.

In response to a system bid award, the airline builds a transition plan that establishes the timing and number of pilot hires, training assignments, advancements, and releases. Based upon the above information, the invention builds a training schedule detailing all training events for each student and training resource.

By using the invention, a complete, optimized solution is obtained rapidly that includes a training schedule which complements the transition plan for the entire planning horizon. In the execution of the solution process, classes are addressed one at a time, then two at a time, then three at a time, and so forth as long as time allotted to the solution process remains. Thus, step by step refinement of the training schedule occurs until either all classes are handled at the same time or no time remains for the solution process. When the solution process has progressed to all classes being handled at the same time, a complete optimized solution is said to have been generated. The primary objective of the training schedule is to minimize the number of pilot days required to teach a fixed curriculum for each pilot with limited training resources. The training schedule which is produced by the invention is constrained by physical limits of the training resources, and contractual limitations imposed by the pilot's contract with the airline. The planning horizon during which training is to occur is variable, but is generally 12 months in duration. By using the invention to create training schedules, certain benefits are realized including training cost savings from better utilization of expensive resources, and reduced time for pilots to complete training.

As the training scheduling problem was studied, it was determined that the problem was too large and too complex to solve with a single model or solution method. The invention therefore decomposes the problem into two parts which are used for each fleet. The first part is a unique branch and bound algorithm where branch and bound trees are used to schedule daily activity for all classes. A single branch and bound tree is not used to schedule all of the classes for a fleet because it is too time consuming. A series of branch and bound trees are used progressively, therefore, to schedule subsets of classes until all classes are scheduled. In the second part, a mixed integer programming model is used to refine the solution from the branch and bound algorithm to obtain a detailed hourly assignment of resources to students and to include time for recurrent training.

In accordance with the invention, training schedules for entire airlines may be both generated and optimized rapidly (from seconds to minutes) to produce minimum length training schedules to ensure that all training requirements are met through efficient use of training resources.

SUMMARY OF THE INVENTION

A method and system for rapidly generating minimum length pilot training schedules is disclosed, wherein unique branch and bound trees are generated for use progressively to schedule training class subsets, and said schedule training class subsets are operated upon by a mixed integer programming model to provide an hourly schedule of resources and events for each student.

In one aspect of the invention, a unique branch and bound method is used to schedule daily events for all classes.

In another aspect of the invention, training curriculums and training classes to be scheduled are examined to determine how many resources and instructors will be required for each type of curriculum, and whether classes with certain properties will have to be split to provide an efficient processing of the branch and bound trees.

In yet another aspect of the invention, pruning rules are established based on user parameters for use in the processing of the branch and bound trees to identify infeasible solutions.

In still another aspect of the invention, a branch and bound method produces a series of branch and bound trees which are used progressively to schedule subsets of classes until all classes are scheduled.

In a further aspect of the invention, a mixed integer programming model is used to refine the solution from the branch and bound method to obtain a detailed hourly assignment of resources and events to students.

In yet a further aspect of the invention, the mixed integer programming model used to refine the solution from the branch and bound method also includes scheduling time for recurrent training.

BRIEF DESCRIPTION OF THE DRAWINGS

Additional objects, features and advantages of the present invention will become apparent from the following detailed description when read in conjunction with the accompanying drawings in which.

DESCRIPTION OF PREFERRED EMBODIMENTS

Figure 1:
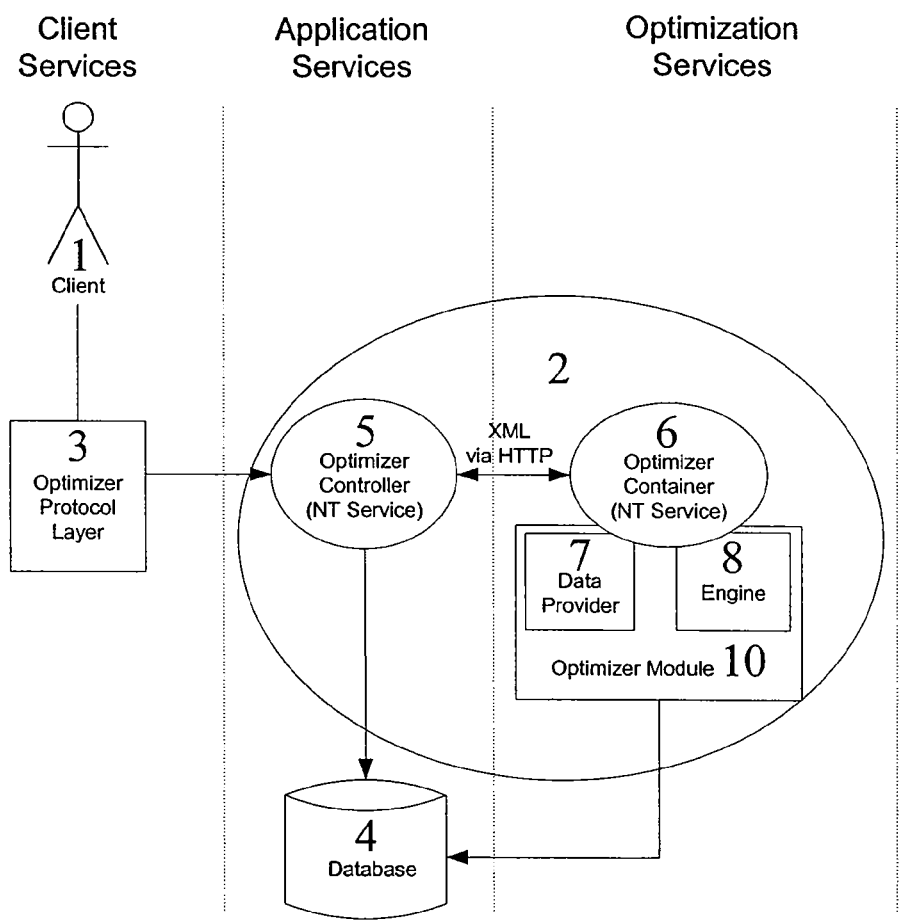
FIG. 1 is a functional block diagram of the system environment in which the present invention operates.

Preferred embodiments of the invention will now be described with reference to the accompanying drawings. In the description, the following terms, whether capitalized or in lower case, shall have the attendant meanings indicated below when used in this specification:

| | |
|---|---|
| System Bid Award | A seniority-based award in which an airline adjusts staffing levels in response to retirements, attrition, and changes in their business plan by awarding pilots new positions. |
| Status | The seat a pilot is assigned to in an aircraft, for example captain, first officer, or second officer. |
| Session Status | An indicator whether a user request is currently being executed or is already completed. |
| Base | A geographical location where pilots are stationed. |
| Minimum Length | The shortest amount of time as measured in the number of days. |
| Footprint | The total number of days that all pilots in a given class spends in training. |
| Training Curriculum | A set of training days that a student must complete to finish training and become qualified for a given fleet. |
| Training Horizon | Set of consecutive calendar days over which training will be scheduled. |
| Training Day | One or more training events that make up the activities a student must complete during a given calendar day of training. |
| Training Event | An activity that makes up part of a training day for a pilot. The event specifies what training resources and instructors are required. |
| Training Requirement | A requirement comprised of both a training type and a fleet. |
| Training Type | An identifier specifying the type of training class required for a particular pilot. Examples are primary system, upgrade, and requalification classes. |
| Fleet | A type of aircraft for which pilots require training. |
| Node | A basic unit used to build data structures, such as trees. Nodes contain data and/or links to other nodes. |
| Root Node | The top node in a tree. All data in a tree can be accessed through the root node. |
| Child Node | A node in a tree that is linked by way of a parent node |
| Parent Node | A node in a tree that links to one or more child nodes. |
| Leaf Node | A node of a tree that has zero child nodes. |
| Tree | A hierarchical data structure made up of a root node and parent, child, and leaf nodes. Parent and child nodes are relative terms, i.e. node B can be the child node of node A and the parent node of node C (A ->B ->C) |
| Descendant Of A Node | A node's child node, or a node's child node's child node, or a node's child node's child node's child node, etc. |
| Infeasible Node Or Solution | Refers to an event which violates the physical capacity of training resources, or violates contractual rules or user requirements. |
| Training Resources | Material resources used during pilot training including classrooms, briefing rooms, full-flight simulators, flight training devices, and cockpit trainers. |
| Device Period | The smallest unit of time for which a full-flight simulator, flight training device, or other training resource is scheduled. By default, a training day has four device periods. E.g., if a device period is four hours, and |

| | -continued |
|---|---|
| | there are 16 hours in a training day, then there are four device periods in a training day. |
| Primary Systems Class | Training class for a pilot who is new to a fleet or has been inactive for a long period of time. These training classes cover the broadest amount of information and skills, and require the most days of training. |
| Upgrade Class | Training class for a pilot who is moving from a first officer status to a captain status within the same fleet. |
| Requalification Class | Training class for a pilot who previously was qualified for a fleet, but due to inactivity needs a refresher course. |
| Day Off Constraints | Contractual rules dictating the number of days off that each student must have while training. |
| XML | Extensible Markup Language (XML) is a well-known data format for passing data from one software application to another. |
| Fleet Options | Maximum footprint extensions and additional training resource time that is available. |
| Recurrent Training | Annual or semiannual one or two day refresher training classes for pilots already qualified for a fleet. |

The environment in which the invention operates is illustrated in FIG. 1, in which user requests and input data are provided by a client 1 to an optimizer system 2 by way of an optimizer protocol layer 3. The optimizer protocol layer 3 uses an XML-based transaction protocol via HTTP over TCP/IP to communicate with the optimizer system 2, and to provide input data to a database 4. In the preferred embodiment, the optimizer system 2 is deployed on a Compaq ProLiant Server with 4 Pentium III 550 MHz processors.

The database 4 has stored therein information including but not limited to available training resources, available training instructors, classes that need to be scheduled, the class roster of each class to be scheduled, individual student training requirements, recurrent training requirements, individual student experience and qualifications, and training curriculum information covering all pilots that need to be scheduled. The database also stores customer optimization requests, and information associated with each request including but not limited to optimization options such as holidays, day off requirements, class start dates, additional training resource time that is available, and optimization request status information. In the preferred embodiment, the database 4 is a Microsoft SQL Server 2000 relational database.

The optimizer system 2 is comprised of an optimizer controller 5 which receives user requests from the optimizer protocol layer 3, and notification and optimizer update messages from an optimizer container 6. The optimizer container 6, a data provider 7, and an optimizer engine 8 are each hosted within an optimizer module 10. The primary function of the optimizer container 6 is to manage the optimizer data provider 7 and the optimizer engine 8. In the preferred embodiment, the optimizer container 6 is a Windows 2000 System Service computer system, and the database 4, the optimizer controller 5, and the optimizer container 6 operate under the Microsoft Windows 2000 Advanced Server Operating System.

In response to a user request, the optimizer controller 5 creates an optimizer session for storage into the database 4, and sends a request acknowledgement and an optimizer session reference to the optimizer protocol layer 3 for relay to the user. Thereafter, the optimizer controller 5 notifies the optimizer container 6 of the request for services by way of an RPC call (processing instructions provided by the XML transaction protocol) routed via HTTP over TCP/IP (a transport protocol implementation).

The optimizer container 6 thereupon verifies to the optimizer controller 5 that it has the necessary resources and request parameters to accommodate the user request. The optimizer container 6 then initializes the optimizer data provider 7 to obtain necessary data from the database 4 for use by the optimizer engine 8. In the preferred embodiment, the data provider 7 and the optimizer engine 8 are implemented as C++ classes within the optimizer module 10, which in turn is deployed as a Windows dynamic link library.

The optimizer engine 8 solves a training schedule problem by executing operations research algorithms to produce an optimized solution based upon the received user request. Pilot training schedules based upon the optimized solution then are generated by the optimizer engine 8.

More particularly, upon receiving the above stated verification from the optimizer container 6, the optimizer controller 5 updates an optimizer session status stored in the database 4 to indicate that the user request is being executed. The optimizer protocol layer 3, upon polling the optimizer controller 5, is thereby notified of the status of the user request and so informs the client 1. Once the optimizer data provider 7 is initialized, the optimizer container 6 sends the user request to the optimizer engine 8 for execution.

The results obtained from the optimizer engine 8 are received by the optimizer container 6, and forwarded to the optimizer controller 5. The optimizer controller 5 thereupon updates the optimizer session status to indicate that the user request has been executed, and that the results are available for access by the user.

Upon the user querying the optimizer controller 5 by way of the optimizer protocol layer 3, the user is informed that the optimization request has been executed, and is provided the results generated by the optimizer engine 8.

The invention described and claimed hereinbelow resides in the optimizer engine 8 in the form of a software program for developing, solving, and interpreting the results of a specialized branch and bound algorithm with custom branch ordering and node bounding techniques, and a mixed integer programming model that provides an optimized solution to the problem of scheduling airline pilots for training each fleet following a system bid award. The invention also may be used to schedule a single class or a group of classes as specified by the client independent of a system bid award.

Figure 2:
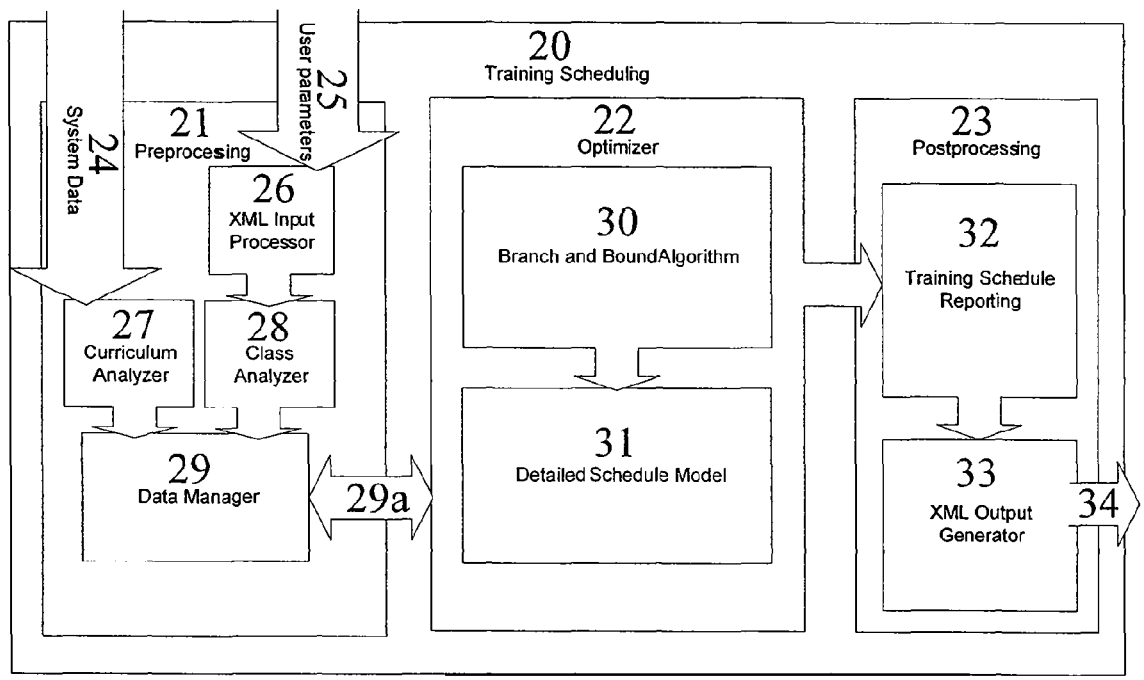
FIG. 2 is a graphic representation of a training scheduling system in accordance with the invention.

Referring to FIG. 2, a training scheduling system 20 in accordance with the present invention consists of three subsystems that reside in the optimizer engine 8 of FIG. 1: a preprocessing subsystem 21, an optimizer subsystem 22, and a postprocessing subsystem 23.

The preprocessing subsystem 21 receives system data including the definition and availability of training resources and training curriculums from database 4 of FIG. 1 by way of the optimizer data provider 7, optimizer container 6, and a data port 24 of FIG. 2. The preprocessing subsystem 21 also receives user parameters in XML format from the client 1 of FIG. 1 by way of the optimizer protocol layer 3, optimizer controller 5, optimizer container 6, and a data port 25 of FIG. 2.

More particularly, the user may provide information regarding classes to be offered, detailed rosters, ideal class start dates and ranges, and fleet options that specify preferences associated with each fleet. The fleet preferences may include the maximum footprint extension allowed, and additional training resource time that is available.

When the training scheduling system 20 is called by way of a command from port 25 to solve a training schedule problem, the system data including the definition and availability of resources and training curriculums received from data port 24 is loaded into a curriculum analyzer module 27, and loaded into a data manager 29. The before mentioned user parameters received by way of port 25 are processed by an XML input processor 26 which translates the user parameters into a form used internally by the software, and produces a set of training classes to be scheduled. The set of classes in turn are received by a class analyzer module 28, which generates pairs of pilots in each class based on each pilot's previous experience and qualifications, and sets ideal start dates for each class.

In order to associate the right training curriculum to a particular pilot, the database 4 of FIG. 1 is searched by pilot ID and the ideal start date of the pilot's class. From the search, the training requirement for the pilot is determined. The training type and fleet found in the training requirement correspond to a training curriculum that identifies all training days and training events that the pilot needs to accomplish to complete his training.

The curriculum analyzer module 27 of FIG. 2 also counts the device periods needed for each pilot for each training event specified by the pilot's curriculum, and determines from the defined resources and their availability the number of device periods free for training each calendar day.

All data received and generated by the preprocessing subsystem 21 is managed by the data manager 29, which stores a list of training curriculums, a list of ordered training days for each curriculum, a list of events for each training day, definitions of devices and instructors needed for each event, class rosters and ideal start dates, a list of all training resources, and related training resource availability calendars.

The optimizer subsystem 22 of FIG. 2 consists of a branch and bound algorithm module 30 and a detailed schedule model module 31. The branch and bound algorithm module 30 receives resource information, class rosters, training curriculums, and a list of classes for training by way of a data port 29a from the data manager 29. The branch and bound algorithm module 30 creates a schedule for each class by determining on which calendar day each training day will take place. This schedule is passed from the branch and bound algorithm module 30 to the detailed schedule model 31, which then determines the detailed assignment of resources. The detailed assignment provides specific times and resources on each calendar day for the pairs of students in each class. The detailed schedule model module 31 also sets aside time for recurrent training to take place.

The results of the optimizer subsystem 22 are accessed by the training schedule reporting module 32 of the postprocessing subsystem 23 to produce summary information for classes and instructors, and detailed schedules for students and training resources. Such summary information and detailed schedules are supplied to an XML output generator 33 for dissemination by way of a data port 34 back to the client 1 of FIG. 1.

Figure 3:
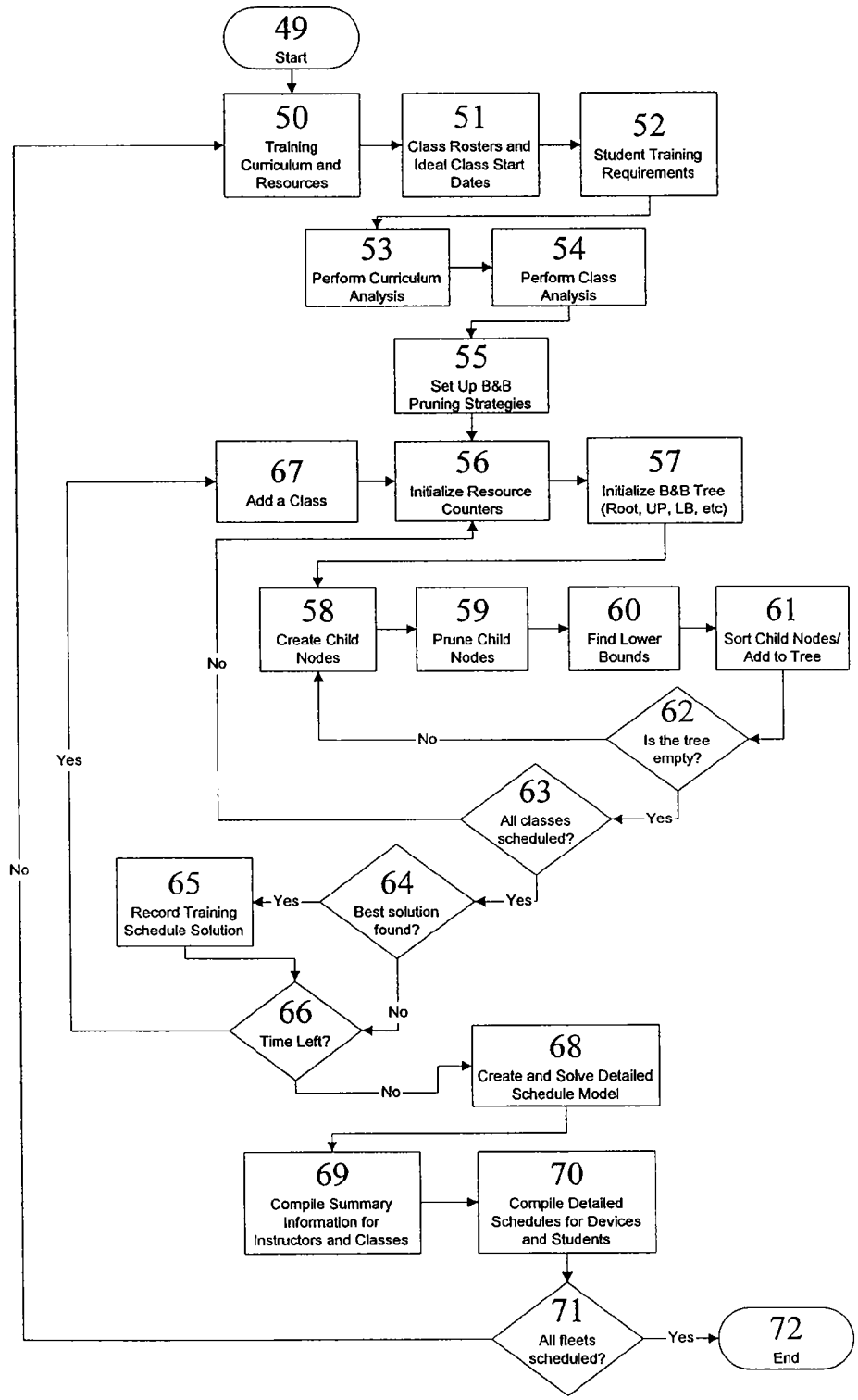
FIG. 3 is a logic flow diagram of the operation of the training scheduling system of FIG. 2.

The methods and processes performed by the training scheduling system 20 of FIG. 2 are illustrated in the detailed logic flow diagram of FIG. 3, where upon entering at logic step 49, the process commences at logic steps 50-52 to gather data for a first fleet. At logic step 50 data relating to training curriculums and training resources are gathered from the optimizer data provider 7 of FIG. 1. The logic flow process then continues to logic step 51 of FIG. 3 where class rosters and ideal class start dates are received from the optimizer data provider 7 of FIG. 1. Thereafter, the logic flow process proceeds to logic step 52 of FIG. 3 to receive from the optimizer data provider 7 of FIG. 1 student training requirements for the students listed in the class rosters of logic step 51 of FIG. 3. The data gathered in logic steps 50-52 consists of all of the data that is necessary for scheduling the training of the fleet.

From logic step 52, the logic flow process continues to logic step 53 where an analysis of the training curriculum takes place to determine the extent to which training resources will be required, and how many instructors will be required to train any combination of students. This logic step 53 is further described in FIG. 4. Thereafter, the logic flow process moves from logic step 53 of FIG. 3 to logic step 54 where each training class is analyzed to determine whether the class has any special attributes, and to group students into pairs as further described in FIG. 5.

From the above, it may be seen that the analysis of the data received at logic steps 50-52 of FIG. 3 takes place at logic steps 53 and 54, which respectively perform the operation of the curriculum analyzer module 27 and class analyzer module 28 of FIG. 2. From logic step 54 of FIG. 3, the logic flow process continues to logic step 55 to set up pruning rules to be used in the branch and bound process. The pruning rules are used to identify infeasible solutions. An example of an infeasible solution would be a solution wherein a class is scheduled to train on a scheduled day off. Logic step 55 is further described in FIG. 6.

Following logic step 55 of FIG. 3, the logic flow process enters the branch and bound process of logic steps 56-67. Logic steps 56-67 describe the operation of the branch and bound module 30 of FIG. 2 as used in the invention.

As a general introduction to the branch and bound method used in connection with the invention, suppose that there are m classes to be scheduled. An exact start date and daily training schedule for each class needs to be determined. The branch and bound method searches a branch and bound tree of possible alternatives. The tree begins at a root node at which nothing has been scheduled. Each node added to the tree represents a partial schedule for one or more training classes. The two factors that describe each node are the day t in the training horizon and the partial schedule (PS) up to that point. Each node, therefore, defines a partial schedule for all classes from day 1 to the day t.

In a given node, the classes that have not yet been completed are called active classes. Given a node D containing a partial schedule PS through day t, a child node D' can be created by trying to schedule a new event or a day off for all active classes to add to the partial schedule of the parent node D. In doing so, node D' will represent a partial schedule up to day t+1. The new partial schedule PS' contains the same partial schedule PS from day 1 to day t from node D, and either a new event or a day off for each active class. Suppose node D has n active classes, it may have at most $2^n$ child nodes. Eventually a child node is added in which all classes being scheduled are completed, and the partial schedule PS is a complete schedule for those classes. This node is identified as a leaf node. A leaf node has no child nodes, since all class schedules are completed and no additional training days or days off can be given. All leaf nodes that are identified are compared to find the best solution in the branch and bound tree. Leaf nodes are compared based upon the number of student days in training that are specified by the completed schedule at that node. The goal is to find the training schedule with the shortest overall footprint in training, i.e., the training schedule with the least number of overall student days devoted to training.

As before stated, the branch and bound technique is a powerful tool used by operations research practitioners to solve difficult combinatorial problems. For a more detailed description of branch and bound techniques see pp. 515-526 of *Introduction to Operations Research* by Frederick S. Hillier and Gerald J. Lieberman, McGraw-Hill, Inc., New York, 1995. The text includes an introductory example with a graphic illustration of a branch and bound tree.

Referring to FIG. 3, resource counters are initialized at logic step 56 to prepare for the branch and bound process. There is a resource counter for each training resource for each day of the training horizon. Each resource counter is a copy of a true resource calendar that shows when the resource is available and when it is unavailable. During the branch and bound process the resource counters are used to track resource use and availability as prospective class schedules are built. The logic flow proceeds from logic step 56 to logic step 57 where the branch and bound tree is initialized. To initialize the tree, a root node is established with day t set to 0 and a lower bound of zero. An upper bound for the tree is also initialized. The upper bound represents the best solution found at any leaf node in the tree. At this stage, since no solutions have yet been found, the upper bound is set to a very large number.

The logic flow process continues from logic step 57 to enter a logic sequence for building a branch and bound tree, and finding a daily solution as performed at logic steps 58-62. At logic step 58 child nodes are created. Thereafter, at logic step 59, nodes that are infeasible are pruned (removed from the tree). From logic step 59, the logic flow process moves to logic step 60 where lower bounds are established for each child node that was not pruned. A lower bound for a node provides an estimate for the best solution that can be found in any descendant of that node. A descendant of a node is that node's child node, or that node's child node's child node, etc.

The logic flow process next continues to logic step 61 where the feasible child nodes are sorted, and added to the branch and bound tree. From logic step 61, the logic flow process proceeds to logic step 62. If the branch and bound tree is found to be not empty, the logic flow process loops back from logic step 62 to logic step 58 to create more child nodes and thereafter continue as before described. If the branch and bound tree is found at logic step 62 to be empty, however, the logic flow process jumps to logic step 63. The branch and bound tree would be found empty if all nodes have been pruned or are leaf nodes.

At logic step 63, a determination is made whether all classes have been scheduled. If not, the logic flow process loops back from logic step 63 to logic step 56 to schedule a next class and continue as before described. Once all classes have been scheduled, the logic flow process moves from logic step 63 to logic step 64 where a determination is made whether a best solution has been found through comparison with prior solutions if they exist. If so, the logic flow process jumps from logic step 64 to logic step 65 where the training schedule solution is recorded. After logic step 65, or if the solution under consideration is not as good as a previous solution as determined at logic step 64, the logic flow process continues to logic step 66 where a determination is made whether there is any more processing time. If so, the logic flow process loops back to logic step 67 to continue as before described. It is to be understood that a limit must be placed initially on processing time for scheduling each fleet so that logic step 66 will eventually lead to logic step 68. If it is found at logic step 66 that no more processing time is available, the logic flow process continues to logic step 68 where the daily schedule determined by the branch and bound process of logic steps 56-65 is converted into a detailed hourly schedule, in which specific students are assigned to specific device periods and specific training resources.

The first time the logic flow process moves through the branch and bound logic steps 56-67, classes are scheduled one at a time. Each time that the logic flow reaches logic step 67, an additional class is added. Thus, upon the occurrence of a second time through logic step 67, classes are scheduled two at a time, and upon a third time through, classes are scheduled three at a time, etc. In this way the long-term problem of scheduling all classes over the entire training horizon is broken into smaller sub-problems scheduling only a subset of the training classes within each branch and bound tree. The strategy employed in this invention strikes a balance between scheduling all of the classes at the same time, which may take an inordinate amount of time, and scheduling only a single class at a time, which can be done very quickly. Thus, branch and bound trees are used in repeated cycles with each tree solving a larger subset of the classes together until processing time is exhausted. By way of example, if the logic flow process passed through logic step 67 twice so that classes are being scheduled three a time, classes 1, 2, and 3 would be scheduled together in the same branch and bound tree. After a solution is found, and the logic flow process moves from logic step 63 back to logic step 56, the schedule for class 1 is kept and the classes 2, 3, and 4 are scheduled together in the same branch and bound tree. This process continues until all classes have been scheduled as determined at logic step 63, and the logic flow process moves on to logic step 64.

Following use of the branch and bound method to develop a daily schedule, it is known that sufficient device periods exist to support all scheduled classes, but it is not known which device periods that the members of each class will occupy. In addition, when alternate devices may be used, it is not known which devices will support the members of each class. At logic step 68, the daily schedule as determined through use of the branch and bound algorithm is converted by a Detailed Schedule Model into a detailed hourly schedule, in which specific students are assigned to specific device periods and specific training resources, and periods for recurrent training are set aside. The Detailed Schedule Model is a mixed integer programming model that takes as its input the daily schedule generated by the branch and bound procedure and the recurrent training requirements, and outputs daily device period assignments for class members, and daily device periods that are set aside for recurrent training.

The model indices and sets used in the Detailed Schedule Model are defined in Table I below:

TABLE I

Model Indices and Sets

| INDEX/SET | DEFINITION |
|---|---|
| I | Class Group Days (CGD) - set of every group from every class on every day in the training horizon that requires a device period assignment. |
| J | Device Period Days (DPD) - set of every available device period on every device on every day in the training horizon. |
| K | Set of 4 device periods each day, labeled 1, 2, 3, and 4. These four device periods are defined here as the same four periods every day, but could vary in number and in placement during the day on different days without loss of generality |
| L | Set of recurrent training types. |
| M | Set of months in the training horizon. |
| N | Set of three threshold levels, labeled 1, 2, and 3. |
| I' ∈ I | Set of CGDs that correspond to the first day of a recurrent training assignment. |

TABLE I-continued

Model Indices and Sets

| INDEX/SET | DEFINITION |
| --- | --- |
| j ∈ E(i) | Set of DPD j that can be assigned to CGD i. |
| i ∈ E(j) | Set of CGD i which DPD j can serve. |
| j ∈ P$_1$(i,k) | Set of DPD j that can be assigned to CGD i in device period k |
| j ∈ P$_2$(i,k) | Set of DPD j which can be assigned to the same class group represented by CGDi on the following training day if the two days are scheduled on consecutive calendar days and CGD i is assigned in device period k. |

The model parameters used in the Detailed Schedule Model are defined in Table II below:

TABLE II

Model Parameters

| Parameter | Definition |
| --- | --- |
| $C_{ij}$ | Cost of assignment of CGD i to DPD j. Assignment to a more preferred device or device period during a day should have a lower cost $C_{ij}$ than a less preferred device or device period. The cost a recurrent training assignment should be a small negative cost encouraging assignment of device periods for recurrent training. |
| $C_{lmn}$ | Balancing cost of level n for training type l in month m (should be set to −n *$C_{ij}$ for the first day of a recurrent training assignment). |
| $W_n$ | Threshold weight of level n. Sum of all weights should be one. Weights for larger levels of n should be larger. |
| $D_{lm}$ | Number of student groups who are due recurrent training of type l in month m. |
| $EG_{lm}$ | Number of student groups who are due recurrent training of type l in month m − 1 but can be trained late plus the number of pilots who are due recurrent training of type l in month m + 1 but can be trained early. |

The model variables used in the Detailed Schedule Model in accordance with the invention include the variables defined in Table III below:

TABLE III

Model Variables

| VARIABLE | DEFINITION |
| --- | --- |
| $x_{ij}$ | Binary variable: 1 if DPD j is assigned to CGD i, 0 otherwise. |
| $y_{lmn}$ | Binary variable: 1 if threshold reached, 0 otherwise. |

Detailed Schedule Model

Objective—Minimize Cost $$\sum_{i \in I, j \in J} C_{ij} x_{ij} + \sum_{l \in L, m \in M, n \in N} C_{lmn} y_{lmn} \quad (1)$$

Subject to:

$$\sum_{j \in E(i)} x_{ij} = 1 \quad \forall\, i\,|\, i \text{ corresponds to a class assignment} \quad (2)$$

$$\sum_{j \in E(i)} x_{ij} \leq 1 \quad \forall\, i\,|\, i \text{ corresponds to a recurrent training assignment} \quad (3)$$

$$\sum_{i \in E(j)} x_{ij} \leq 1 \quad \forall\, j \quad (4)$$

$$\sum_{j \in P_1(i,k)} x_{ij} - \sum_{j \in P_2(i,k)} x_{ij} \leq 0 \quad \forall\, i, k\,|\, CGD\ i \text{ needs a } DPD \text{ on the following day} \quad (5)$$

$$\sum_{i \in I'} \sum_{j \in E(i)} x_{ij} \leq D_{lm} + EG_{lm} \sum_{n \in N} W_n * y_{lmn} \quad \forall\, l, m \quad (6)$$

The objective function of equation (1) minimizes the cost of the model solution by using the most preferred training devices and device periods for each student, and by providing the most device times for recurrent training assignments. When alternate devices may be used, the assignment of a more preferred device has a lower cost $C_{ij}$ than a less preferred device. When alternate device periods may be assigned, the assignment of a more preferred device period during a day has a lower cost $C_{ij}$ than a less preferred device period. The cost of a recurrent training assignment has a small negative cost $C_{ij}$, thus encouraging the assignment of as many device periods for recurrent training as possible.

The constraint of equation (2) forces the assignment of a DPD j to each CGD i. The constraint of equation (3) allows assignment of a DPD j to recurrent training CGD i. The constraint of inequality (4) ensures that no DPD j is assigned to more than one CGD i. The constraint of inequality (5) ensures that on consecutive device days, class groups are assigned to legal device periods. Due to contractual obligations, pilot can only train in the same device period or the following device period on two consecutive training days. This constraint can accommodate other rules for scheduling on consecutive days by changing the definition of sets P$_1$(i,k) and P$_2$(i,k). The constraint of inequality (6) encourages even distribution of resources among multiple competing recurrent training types.

For robustness, a slack variable (as defined at page 87 of "Introduction to Operations Research", by Frederick S. Hillier and Gerald J. Lieberman, McGraw-Hill, Inc., New York, 1995) with high cost may be added to the constraint of inequality (5) to ensure feasibility. In testing, this variable has not been found to be needed. The constraint of inequality (6) is only needed if a fleet has more than one type of recurrent training to be scheduled, and should not otherwise be included in the model.

Returning to FIG. 3, following generation of the detailed hourly schedule by the Detailed Schedule Model of logic step 68, the logic flow process continues in sequence to logic steps 69 and 70 to convert the mathematical solution of logic step 68 into class summaries and detailed hourly student schedules. From logic step 70, the logic flow process moves to logic step 71 to determine whether all fleets have been scheduled. If not, the logic flow process loops back from logic step 71 to logic step 50 to continue as before described. If it is determined at logic step 71 that all fleets have been scheduled, however, the logic flow process jumps from logic step 71 to initiate the XML report generator of logic step 33 of FIG. 2 to translate the reports for transfer through the data port 34 where they are accessible to the user.

Figure 4:
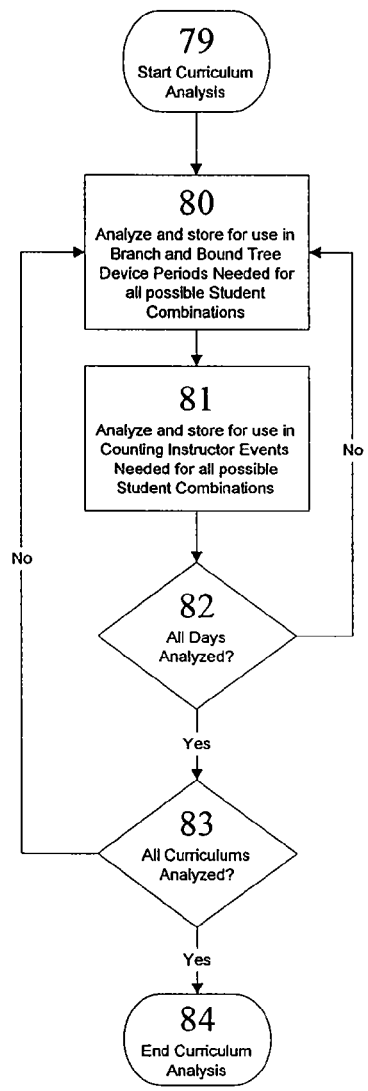
FIG. 4 is a logic flow diagram of the curriculum analysis performed at logic step 53 of FIG. 3.

Referring to FIG. 4, the logic flow process for a curriculum analysis starts at logic step 79 and moves to logic step 80, where an analysis is made to determine how many device periods are required for all combinations of students that may require training on a particular day. For example, on a certain day one or two pilots may require one device period, while three pilots may require two device periods on a training resource. From logic step 80, the logic flow process proceeds to logic step 81 where an analysis is performed to determine how many instructors and instructor qualifications that are required for any combination of students on a day of training. For example, on a given day two pilots may require a single flight instructor, while a single student will require both one flight instructor and one ground instructor. The device period and instructor information is stored for later use in the above described branch and bound processes.

From logic step 81, the logic flow process continues to logic step 82 where a determination is made whether all training days have been analyzed. If not, the logic flow process loops back to logic step 80 to continue as before described. If so, the logic flow process proceeds from logic step 82 to logic step 83 to determine whether all training curriculums have been analyzed. If all training curriculums have not been analyzed, the logic flow process loops back from logic step 83 to logic step 80 to continue as before described. If all training curriculums have been analyzed, however, the logic flow process continues to logic step 84 to terminate the curriculum analysis.

From the above descriptions, it may be seen that the analyses performed in logic steps 80 and 81 are repeated for each training day in each curriculum as indicated by the logic feedback loops emanating from logic steps 82 and 83.

Figure 5:
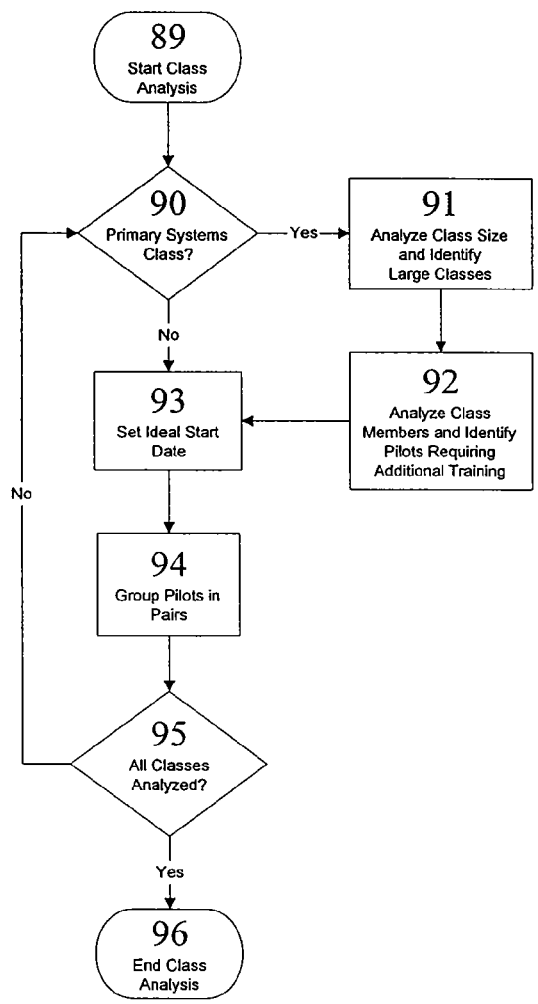
FIG. 5 is a logic flow diagram of the class analysis performed at logic step 54 of FIG. 3.

Referring to FIG. 5, a class analysis logic flow process starts at logic step 89 and proceeds to logic step 90, where classes are partitioned into primary system and non-primary system classes. Primary system classes refer to the longest type of training for each fleet. These training classes cover the broadest amount of information and skills, and are offered to pilots who are new to a fleet or have been inactive for a long time. Non-primary system classes are shorter, and are designed for pilots with some experience on a fleet. Examples of non-primary system classes are upgrade and requalification classes.

If it is determined at logic step 90 that a class under consideration is a primary system class, the logic flow process jumps to logic step 91. If the class under consideration at logic step 90 is a non-primary system class, however, the logic flow process continues to logic step 93. At logic step 91, a determination is made whether a class has so many students that there are not enough training resources for all members of the class to complete all training events on a same calendar day. If this is the case, those training events that cannot be completed by all students on the calendar day are marked, and the class is split into sub-classes beginning the first event of the calendar day. From logic step 91, the logic flow process moves to logic step 92 to check for pilots who need special training. An example of a need for special training occurs when a pilot is to be assigned to a new base. A base is a geographic location where a pilot is assigned to work. Flying that takes place out of certain geographic locations requires additional training. Class members requiring such special training are identified so that the additional training will be scheduled during the operation of the above described branch and bound method.

Logic steps 91 and 92 determine whether properties of a class, or student members of a class, require special treatment during the operation of the branch and bound method. Two requirements for special treatment are indicated in logic steps 91 and 92, and could be easily altered to accommodate other special conditions.

From logic step 92, the logic flow process moves to logic step 93 where an ideal start date is set for the class under consideration. The ideal start date is the date entered by the user, or, if the user does not provide a date, the date which is assigned in such a way that classes are spread out evenly for each fleet throughout the training horizon. The logic flow process continues from logic step 93 to logic step 94, where pilots are grouped into pairs. Many training events take place in pairs. Pilots are paired together based on each pilot's experience and qualifications. For classes with an odd number of students, the odd student is not paired with another student, and will complete those classes alone or with an additional instructor filling in as the other member of a pair.

Following logic step 94, the logic flow process proceeds to logic step 95 where a determination is made whether all classes have been analyzed. If not, the logic flow process loops back to logic step 90 to continue as before described. If all classes have been analyzed, however, the logic flow process continues from logic step 95 to logic step 96 to terminate the analysis.

Figure 6:
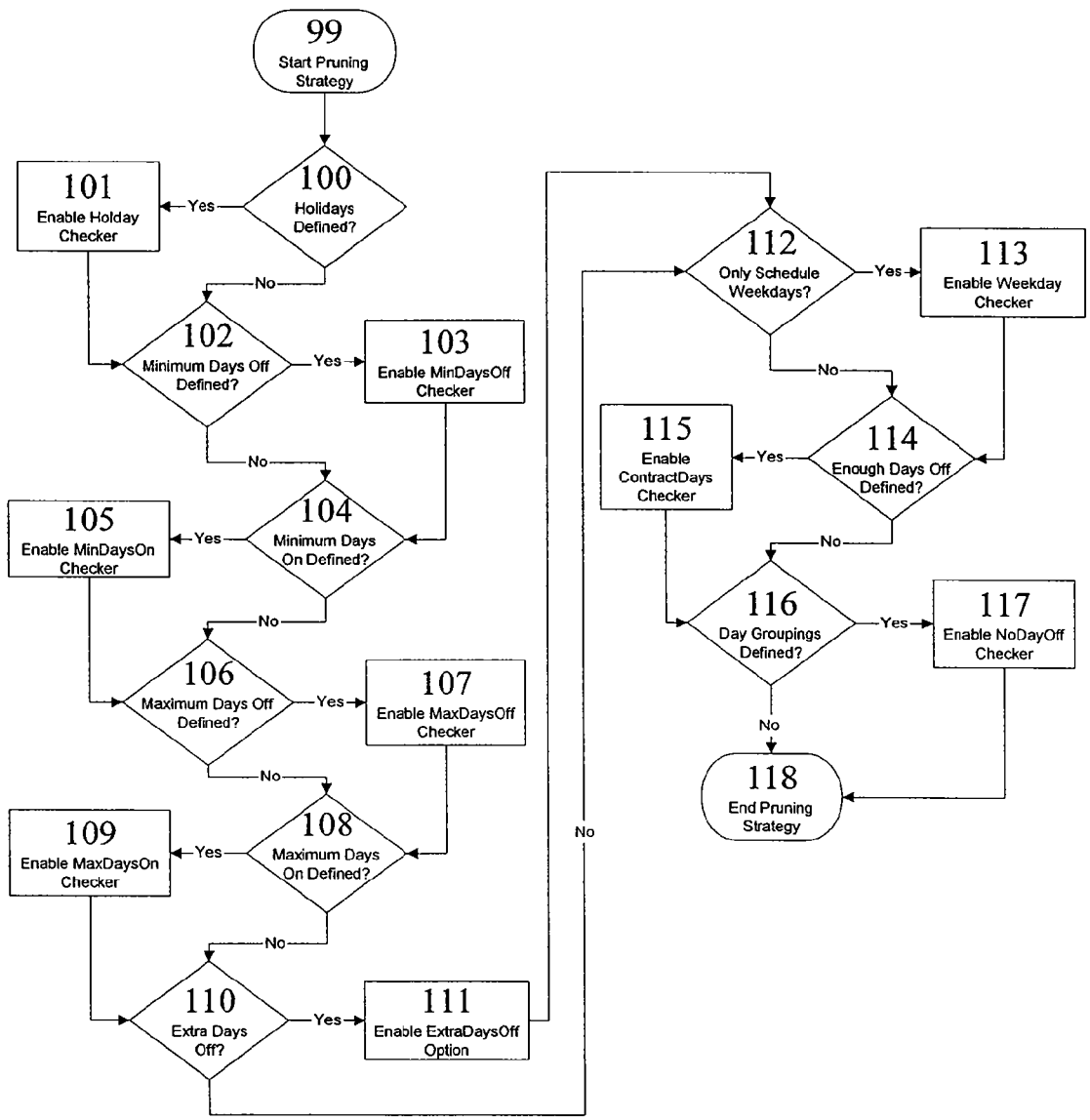
FIG. 6 is a logic flow diagram of the preparation of pruning rules as performed at logic step 55 of FIG. 3.

Referring to FIG. 6, the logic flow process for setting up pruning rules to be used in the branch and bound process is illustrated, wherein a series of yes/no questions relating to the curricula defined for a fleet is addressed. If the answer is yes, a pruning rule is established for use in the branch and bound process; otherwise, the logic flow proceeds directly to a next question.

The logic flow process of FIG. 6 begins with logic step 99 and proceeds to logic step 100, where a determination is made as to whether student holidays have been defined. The holidays represent those days during which the training of students will be suspended. Example holidays may include Thanksgiving, Christmas, and New Year's Day. If holidays are not defined at logic step 100, the logic flow process continues to logic step 102. If holidays are defined, however, the logic flow process moves from logic step 100 to logic step 101, where a Holiday Checker is enabled to ensure that students will not be trained on the defined holidays. Thereafter, the logic flow process continues to logic step 102 to determine whether a minimum number of days off have been defined. If so, the logic flow process jumps to logic step 103 where the MinDaysOff Checker is enabled with the specified number of days. This checker ensures that if any days off are specified, they occur consecutively. Thereafter, the logic flow process continues to logic step 104 to determine whether minimum training days have been specified. If no minimum days off have been specified at logic step 102, the logic flow process continues to logic step 104.

If at logic step 104 minimum days on have been specified, the logic flow process jumps to logic step 105 where a MinDaysOn Checker is enabled with the specified number of days. This checker ensures that if any days of training occur, at least the specified number of training days are scheduled consecutively. Following logic step 105, or following logic step 104 if no minimum days are specified, the logic flow process moves to logic step 106 to determine whether a maximum number of days off have been specified. If so, the logic flow process jumps to logic step 107 where a MaxDaysOff Checker is enabled with the specified number of days. This checker ensures that if any days off are given, no more than the specified number of days off are given consecutively. Following logic step 107, or if no maximum number of days off are specified at logic step 106, the logic flow process proceeds to logic step 108 to determine whether a maximum number of training days have been specified. If so, the logic flow process jumps to logic step 109 where a MaxDaysOn Checker is enabled with the specified number of days. This checker ensures that if any training days are scheduled, no more than the specified number of training days are scheduled consecutively.

Following logic step 109, or if no maximum number of days is specified at logic step 108, the logic flow process moves to logic step 110 to determine whether any extra days off have been defined. If so, the logic flow process jumps to logic step 111 where an ExtraDaysOff Option is enabled. This option is used to ensure that pilots who are contractually entitled receive additional days off. One example of pilots so entitled would be pilots who are stationed at bases too remote for a short term visit to their homes. The ExtraDaysOff Option adjusts the MaxDaysOff Checker of logic step 107 to allow for the extra days off. From logic step 110 if no extra days off are specified, or following logic step 111, the logic flow process moves to logic step 112 to determine whether scheduling only on weekdays has been specified. If so, the logic flow process proceeds to logic step 113 where a Week-Day Checker is enabled. This checker ensures that if any training days are scheduled, they are scheduled only on weekdays.

Following logic step 113, of if no restriction to schedule only on weekdays is detected at logic step 112, the logic flow process moves to logic step 114 to determine whether enough days off have been specified in each curriculum to satisfy contractual obligations. If so, the logic flow process proceeds to logic step 115 where a ContractDays Checker is enabled. This checker ensures that in scheduling a training class, enough days off are provided to meet contractual obligations. From logic step 115, or if enough days off are not specified at logic step 114, the logic flow process moves to logic step 116 to determine whether day groupings have been defined. If so, the logic flow process jumps to logic step 117 where a NoDayOff Checker is enabled. This checker ensures that if groups of training days have been specified in the curriculum with no days off between them, such training days are scheduled consecutively. If no day groupings have been defined at logic step 116, or following logic step 117, the logic process continues to logic step 118 to end the pruning strategy process and return to logic step 56 of FIG. 3.

Figure 7:
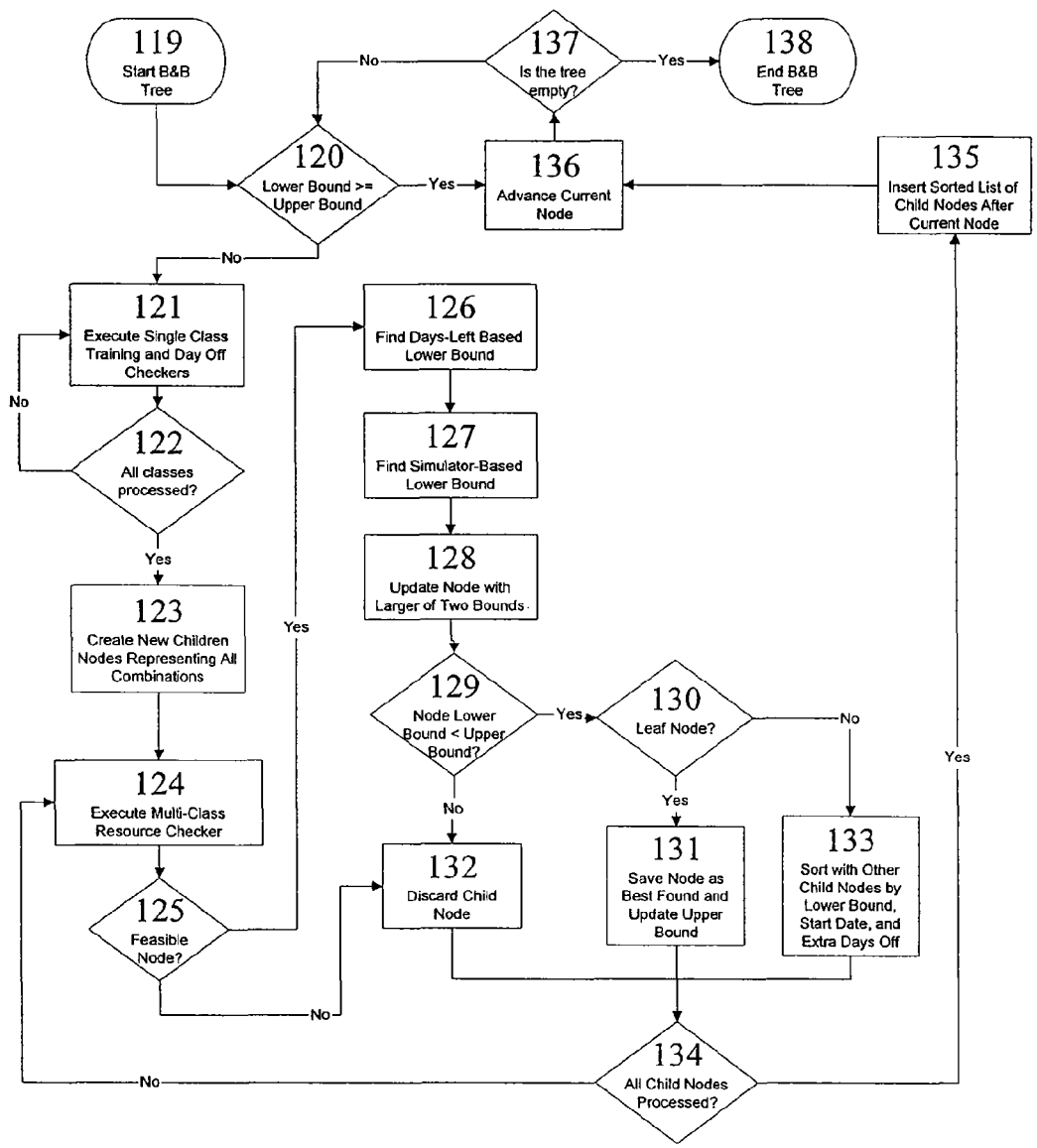
FIG. 7 is a logic flow diagram of the generation of the branch and bound logic decision tree as performed at logic steps 59, 60, 61, and 62 of FIG. 3.

Referring to FIG. 7, the logic flow process begins at logic step 119 and then proceeds to logic step 120 to determine whether the lower bound of a current node is less than the upper bound for the branch and bound tree. When logic step 120 is first entered, the current node is a root node which has a lower bound of zero and the upper bound of the branch and bound tree is a very large number. The lower bound of the root node thus is less than the upper bound of the branch and bound tree, and the logic flow process moves to logic step 121 to begin the creation of child nodes for the current node.

Logic step 121 is executed once for each class to be scheduled. At logic step 121, the Holiday, MinDaysOff, MinDaysOn, MaxDaysOff, MaxDaysOn, Weekday, ContractDays, and NoDayOff checkers illustrated in FIG. 6 are applied to determine if a next day for a class must be a training day, must be a day off, or may be either a training day or a day off. From logic step 121 of FIG. 7, the logic flow process continues to logic step 122 to determine whether all classes to be considered have been analyzed. If not, the logic flow process loops back to logic step 121 to continue as before described. If there are no more classes to analyze, however, the logic flow process continues from logic step 122 to logic step 123, where the information gathered at logic step 121 is used to create new child nodes for the current node. The new child nodes represent all possible combinations of scheduling a training day or a day off for a next day for all classes being scheduled.

Following logic step 123, the logic flow process enters a logic network comprised of logic steps 124-134 for each new child node created in logic step 123. More particularly, the logic flow process proceeds from logic step 123 to logic step 124 where a Multi-Class Resource checker is enabled to allow a determination at logic step 125 as to whether sufficient training resources exist to support all of the classes that are given new training days in the child node under consideration. If there are sufficient training resources, the logic flow process moves from logic step 125 to logic step 126 where a days-left based lower bound is established for the child node. This lower bound combines the number of remaining training days and days off defined in the curriculum, with the number of contractually obligated days off remaining, to determine the minimum number of days before the class under consideration can be completed. Following logic step 126, the logic flow process continues to logic step 127 where a simulator-based lower bound is established. This lower bound combines the number of remaining training days on which a simulator is required, with the future availability of such simulators, to determine a minimum number of days before the class under consideration can be completed. Thereafter, the logic flow process moves to logic step 128 where the larger of the lower bounds of logic steps 126 and 127 is applied to the child node under consideration.

From logic step 128, the logic flow process continues to logic step 129 to compare the lower bound of the child node under consideration with the branch and bound tree upper bound. If the lower bound of the child node is greater than or equal to the upper bound of the branch and bound tree, or if the child node is found to be infeasible at logic step 125, the logic flow process continues to logic step 132 to discard the child node.

The lower bound of the child node represents the best solution that can possibly result from a descendant of the node. If the lower bound is larger than the upper bound of the branch and bound tree, which represents the best solution found so far, there is no reason to keep the child node. If, on the other hand, the lower bound is less than the upper bound of the branch and bound tree, the logic flow process jumps from logic step 129 to logic step 130 to determine whether the child node is a leaf node. If so, the logic flow process continues to logic step 131 where the completed schedule for the child node under consideration is saved as the best found, and the upper bound of the branch and bound tree is updated to reflect the number of training days in the completed schedule. If it is determined at logic step 130 that the child node is not a leaf node, the logic flow process moves from logic step 130 to logic step 133 to sort the child nodes of logic step 123 first by their lower bounds, then by how close their actual start dates are to their ideal start dates, and lastly by the number of days off that are included in the partial schedules of the child nodes. From logic steps 131, 132, or 133, the logic flow process moves to logic step 134 to determine whether there are additional child nodes to process. If so, the logic flow process returns to logic step 124. Otherwise, the logic flow process jumps to logic step 135 where any sorted child nodes that exist are inserted after the current node into the branch and bound tree.

From logic step 135, the logic flow process moves to logic step 136 where the current node is advanced to the next node in the branch and bound tree. Thereafter, the logic flow process proceeds to logic step 137 to determine whether the branch and bound tree is empty, i.e. there are no remaining nodes to examine. If the branch and bound tree is empty, the logic flow process moves to logic step 138 to end the branch and bound tree process. If the branch and bound tree is found at logic step 137 to not be empty, the logic flow process proceeds to logic step 120 to determine whether the lower bound of the current node is greater than or equal to the upper bound of the branch and bound tree as before described. If so, the logic flow process jumps to logic step 136 to continue as before described. After the branch and bound tree process ends at logic step 138, the logic flow process returns to logic step 63 of FIG. 3.

Figure 8:
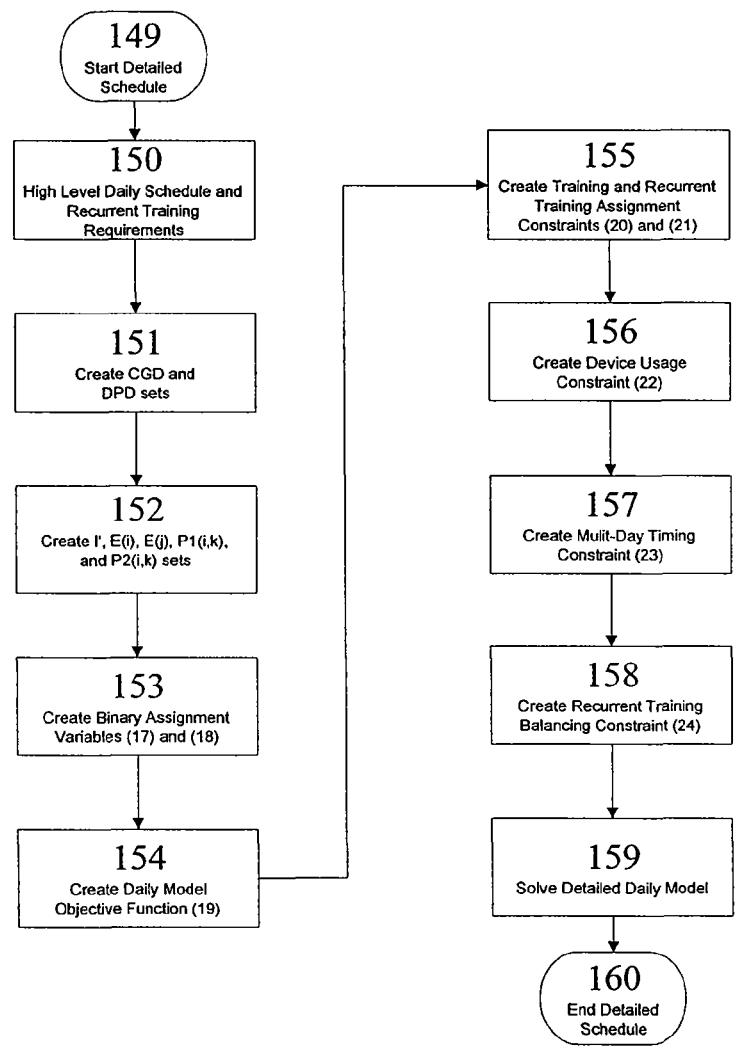
FIG. 8 is a logic flow diagram of the detailed schedule model and solution generated at logic step 68 of FIG. 3.

Referring to FIG. 8, the logic flow process enters at logic step 149 and continues to logic step 150 to receive a daily schedule which represents the best solution found by the branch and bound method in accordance with the invention before time expires at logic step 66 of FIG. 3. Recurrent training requirements for pilots are also received at logic step 150 of FIG. 8 from the data manager 29 of FIG. 2. The logic flow process then proceeds to logic step 151 of FIG. 8 where set I of class group days and set J of device period days are created based upon the daily schedule generated by the branch and bound method. From logic step 151, the logic flow process moves to logic step 152 where the sets I'∈I, j∈E(i), i∈E(j), j∈$P_1$(i,k), and j∈$P_2$(i,k) are generated. Thereafter, the logic flow process continues to logic step 153 where the binary variables $x_{ij}$ and $y_{lmn}$ are created to respectively assign device period days to class group days, and to mark threshold values in the constraint of inequality (6).

From logic step 153, the logic flow process moves to logic step 154 to create the daily model objective function of equation (1), and thereafter proceeds to logic step 155 to create the training and recurrent training assignment constraints of equation (2) and inequality (3). Thereafter, the logic flow process continues to logic step 156 to create the device usage constraint of inequality (4), and then proceeds to logic step 157 to create the multi-day timing constraint of inequality (5).

From logic step 157, the logic flow process continues to logic step 158 where the recurrent training balancing constraint of inequality (6) is created if a fleet has more than one type of recurrent training. Thereafter, the logic flow process moves to logic step 159 where an optimal solution to the Detailed Schedule Model of equations (1) and (2), and inequalities (3)-(6) is found. As before stated, the Detailed Schedule Model is a mixed integer programming model. Test results indicate that this model can be solved in seconds by using commercially available software development kits and runtime libraries such as ILOG Concert Technology 1.0 and ILOG CPLEX 7.0 sold by ILOG, Inc. of Paris, France. In the preferred embodiment, the invention integrates such commercially available software development kits and runtime libraries to solve the Detailed Schedule Model of logic step 159. Following logic step 159, the logic flow process moves to logic step 160 and then to logic step 69 of FIG. 3.

Figure 9:
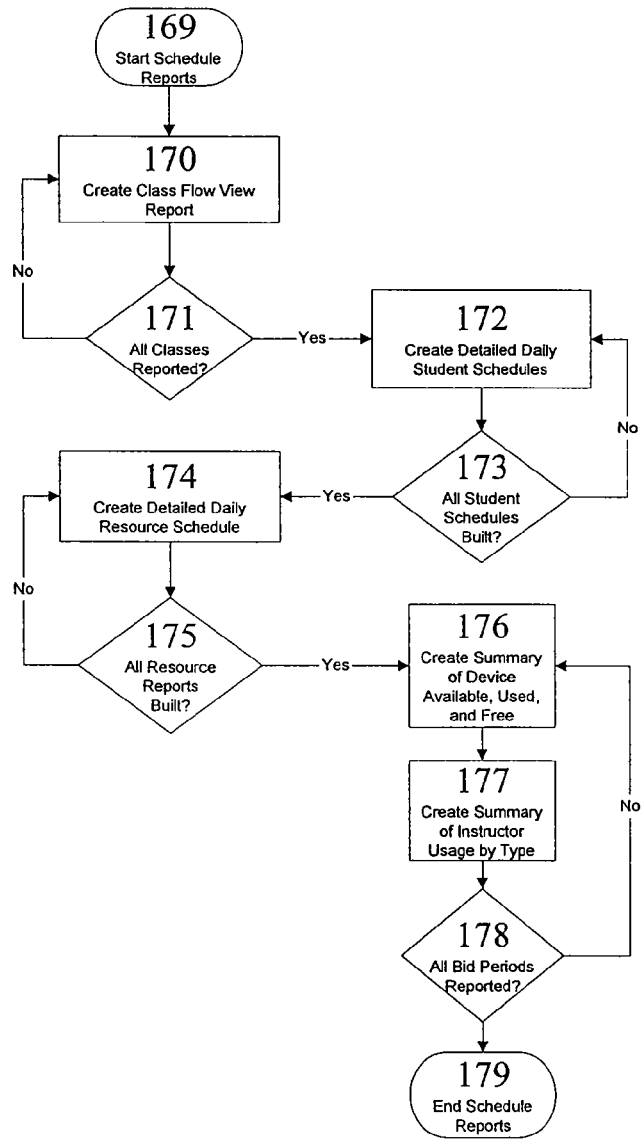
FIG. 9 is a logic flow diagram of the process for building training schedule reports as performed at logic steps 69 and 70 of FIG. 3.

Referring to FIG. 9, the logic flow process starts at logic step 169 and continues to logic step 170, where a class flow view report is generated. This report indicates for each calendar day whether a training day for a class is to occur, or whether the calendar day is a day off. For training days, the report also will include information about which training resource, if any, is being used and what time the training day begins for the students. From logic step 170, the logic flow process continues to logic step 171 where a determination is made whether reports have been generated for all classes. If not, the logic flow process loops back to logic step 170 to continue as before described. If all reports for all classes have been generated, however, the logic flow process jumps to logic step 172 where detailed daily student schedules are constructed. These schedules are more detailed than the class flow views in that additional information is provided including training resource locations, beginning and end times for each event in the day, special notes about the days activities, and an indication of whether there will self-paced computer based work for the student to complete that day. This additional information is defined in the curriculum to be reported in the student schedules.

The logic flow process continues from logic step 172 to logic step 173, where a determination is made whether schedules for all students have been generated. If not, the logic flow process loops back to logic step 172 to continue as before described. If schedules for all students have been generated as determined at logic step 173, the logic flow process moves to logic step 174 where daily detailed training resource schedules are constructed. These resource schedules show all training activity that is scheduled each calendar day, including which classes, and which class members are using the resource under consideration. From logic step 174, the logic flow process continues to logic step 175 and then loops back to logic step 174 to continue as before described if schedules have not yet been generated for all training resources. If all daily resource schedules have been completed, however, the logic flow process continues in sequence to logic steps 176 and 177, where summary information is collected for each bid period in the training horizon. More particularly, logic step 176 collects a summary of device usage and logic step 177 uses the information gathered in logic step 81 of FIG. 4 to compile a summary of instructors required by the training schedule. From logic step 177 of FIG. 9, the logic flow process continues to logic step 178 to determine whether all bid period reports have been completed. If so, the logic flow process continues to logic step 179 to return to logic step 71 of FIG. 3. Otherwise, the logic flow process loops back from logic step 178 of FIG. 9 to logic step 176 to continue as before described.

The present invention has been particularly shown and described in detail with reference to a preferred embodiment, which is merely illustrative of the principles of the invention and is not to be taken as a limitation to its scope. By way of example, the invention is applicable to any environment having a specified order or variable ordering of training days, and resource use requirements for certain of those days, and also applicable whether a single class or a group of classes are to be scheduled. It further will be readily understood by those skilled in the art, operations research, that substitution of equivalent elements, reordering of steps, and other modifications and alterations of the invention may occur without departing from the scope and spirit of the invention. The appended claims are intended to include within their scope such modifications and alterations.

What is claimed is:

1. A computer-implemented method comprising:
   receiving fleet training information including class, curriculum, resource, student, and instructor information from a user and a database;
   building branch and bound trees having a root node and plural child nodes each representing an alternative partial schedule for one or more pilot training classes, wherein, for a particular node that defines a partial schedule for all pilot training classes through a particular day, a child node of the particular node defines a partial schedule of all pilot training classes through a day after the particular day, and wherein said branch and bound trees are used in repeated cycles until a predetermined processing time limit is exhausted;
   for each cycle:
   (i) pruning from said branch and bound trees those of said plural child nodes which violate logical rules pertaining to said pilot training classes;

(ii) estimating a lower bound for each of remaining child nodes of said branch and bound trees, said lower bound providing an estimate for a solution that can be found in any descendant of that node;

(iii) selecting from said remaining child nodes, solution child nodes having least lower bounds;

(iv) generating from said solution child nodes having least lower bounds daily student and resource schedules for a progressively greater number of said pilot training classes in each cycle; and (v) determining whether additional processing time is available;

building, by one or more computers, a mixed integer programming model from said daily student and resource schedules generated from said solution child nodes from said branch and bound trees, and from recurrent training requirements received from said user and said database, wherein said mixed integer programming model comprises a cost assignment of a class group and a balancing cost, solving said mixed integer programming model to provide detailed hourly student and resource schedules at a device period level, and provide time for recurrent training, and outputting said detailed hourly student and resource schedules for dissemination.

2. The method of claim 1, wherein the mixed integer programming model comprises a product of a first binary variable and the cost assignment of a class group and a product of a second binary variable and the balancing costs.

3. The method of claim 2, wherein said mixed integer programming model is expressed as:

$$\sum_{i \in I, j \in J} C_{ij} x_{ij} + \sum_{l \in L, m \in M, n \in N} C_{lmn} y_{lmn}.$$

wherein $C_{ij}$ represents the cost of assignment of a class group and $x_{ij}$ represents the first binary variable, where i represents a class group day and j represents a device period day, $C_{lmn}$ represents the balancing cost of level n for training type l in month m and $y_{lmn}$ represents the second binary variable.

4. The method of claim 3, wherein the mixed integer programming model includes the following constraints:

$$\sum_{j \in E(i)} x_{ij} = 1; \quad \text{(ii)}$$

where $\forall i \mid i$ corresponds to a recurring training assignment;

$$\sum_{i \in E(j)} x_{ij} \leq 1, \text{ where } \forall j; \quad \text{(iii)}$$

$$\sum_{j \in P_1(i,k)} x_{ij} - \sum_{j \in P_2(i,k)} x_{ij} \leq 0, \text{ where } \forall i, \quad \text{(iv)}$$

k | CGD i needs a DPD on the following day; and $$\sum_{i \in I'} \sum_{j \in E(i)} x_{ij} \leq D_{lm} + EG_{lm} \sum_{n \in N} W_n * y_{lmn}, \forall l, m; \quad \text{(v)}$$

where $j \in E(i)$ represents a set of device period day j that can be assigned to class group day i, $i \in E(j)$ represents a set of class group day i which device period day j can serve, $j \in P_1(i,k)$ represents a set of device period day j that can be assigned to class group day i in device period k, $j \in P_2(i,k)$ represents a set of device period day j that can be assigned to the same class group represented by class group day i on the following training day in a device period k, $i \in I'$ represents a set of class group days that correspond to the first day of a recurrent training assignment, $D_{lm}$ represents a number of student groups who are due recurrent training of type l in month m, $EG_{lm}$ represents a number of student groups who are due recurrent training of type l in month m−1 but can be trained late, plus a number of pilots who are due recurrent training of type l in month m+1 but can be trained early, $n \in N$ represents a set of threshold levels, $W_n$ represents a threshold weight of level n, and $y_{lmn}$ represents a binary variable with a value of one if a threshold is reached and a value of zero otherwise.

5. A system comprising:

one or more computers; and a non-transitory computer-readable storage medium coupled to the one or more computers having instructions stored thereon which, when executed by the one or more computers, cause the one or more computers to perform operations comprising:

receiving fleet training information including class, curriculum, resource, student, and instructor information from a user and a database;

building branch and bound trees having a root node and plural child nodes each representing an alternative partial schedule for one or more pilot training classes, wherein, for a particular node that defines a partial schedule for all pilot training classes through a particular day, a child node of the particular node defines a partial schedule of all pilot training classes through a day after the particular day, and wherein said branch and bound trees are used in repeated cycles until a predetermined processing time limit is exhausted;

for each cycle:

(i) pruning from said branch and bound trees those of said plural child nodes which violate logical rules pertaining to said pilot training classes;

(ii) estimating a lower bound for each of remaining child nodes of said branch and bound trees, said lower bound providing an estimate for a solution that can be found in any descendant of that node;

(iii) selecting from said remaining child nodes, solution child nodes having least lower bounds;

(iv) generating from said solution child nodes having least lower bounds daily student and resource schedules for a progressively greater number of said pilot training classes in each cycle; and (v) determining whether additional processing time is available;

building a mixed integer programming model from said daily student and resource schedules generated from said solution child nodes from said branch and bound trees, and from recurrent training requirements received from said user and said database, wherein said mixed integer programming model comprises a cost assignment of a class group and a balancing cost, solving said mixed integer programming model to provide detailed hourly student and resource schedules at a device period level, and provide time for recurrent training, and outputting said detailed hourly student and resource schedules for dissemination.

6. The system of claim 5, wherein the mixed integer programming model comprises a product of a first binary variable and the cost assignment of a class group and a product of a second binary variable and the balancing costs.

7. The system of claim 6, wherein said mixed integer programming model is expressed as:

$$\sum_{i \in I, j \in J} C_{ij} x_{ij} + \sum_{l \in L, m \in M, n \in N} C_{lmn} y_{lmn}.$$

wherein $C_{ij}$ represents the cost of assignment of a class group and $x_{ij}$ represents the first binary variable, where i represents a class group day and j represents a device period day, $C_{lmn}$ represents the balancing cost of level n for training type l in month m and $y_{lmn}$ represents the second binary variable.

8. The system of claim 7, wherein the mixed integer programming model includes the following constraints:

$$\sum_{j \in E(i)} x_{ij} = 1; \quad \text{(ii)}$$

where $\forall\, i\,|\,i$ corresponds to a recurring training assignment, $$\sum_{i \in E(j)} x_{ij} \leq 1, \text{ where } \forall\, j; \quad \text{(iii)}$$

$$\sum_{j \in P_1(i,k)} x_{ij} - \sum_{j \in P_2(i,k)} x_{ij} \leq 0, \text{ where } \forall\, i, \quad \text{(iv)}$$

$k\,|\,CGD\ i$ needs a $DPD$ on the following day; and $$\sum_{i \in I'} \sum_{j \in E(i)} x_{ij} \leq D_{lm} + EG_{lm} \sum_{n \in N} W_n * y_{lmn}, \forall\, l, m; \quad \text{(v)}$$

where $j \in E(i)$ represents a set of device period day j that can be assigned to class group day i, $i \in E(j)$ represents a set of class group day i which device period day j can serve, $j \in P_1(i,k)$ represents a set of device period day j that can be assigned to class group day i in device period k, $j \in P_2(i,k)$ represents a set of device period day j that can be assigned to the same class group represented by class group day i on the following training day in a device period k, $i \in I'$ represents a set of class group days that correspond to the first day of a recurrent training assignment, $D_{lm}$ represents a number of student groups who are due recurrent training of type l in month m, $EG_{lm}$ represents a number of student groups who are due recurrent training of type l in month m−1 but can be trained late, plus a number of pilots who are due recurrent training of type l in month m+1 but can be trained early, n∈N represents a set of threshold levels, $W_n$ represents a threshold weight of level n, and $y_{lmn}$ represents a binary variable with a value of one if a threshold is reached and a value of zero otherwise.

9. A computer storage medium encoded with a computer program, the program comprising instructions that when executed by one or more computers cause the one or more computers to perform operations comprising:
receiving fleet training information including class, curriculum, resource, student, and instructor information from a user and a database;
building branch and bound trees having a root node and plural child nodes each representing an alternative partial schedule for one or more pilot training classes, wherein, for a particular node that defines a partial schedule for all pilot training classes through a particular day, a child node of the particular node defines a partial schedule of all pilot training classes through a day after the particular day, and wherein said branch and bound trees are used in repeated cycles until a predetermined processing time limit is exhausted;
for each cycle:
(i) pruning from said branch and bound trees those of said plural child nodes which violate logical rules pertaining to said pilot training classes;
(ii) estimating a lower bound for each of remaining child nodes of said branch and bound trees, said lower bound providing an estimate for a solution that can be found in any descendant of that node;
(iii) selecting from said remaining child nodes, solution child nodes having least lower bounds;
(iv) generating from said solution child nodes having least lower bounds daily student and resource schedules for a progressively greater number of said pilot training classes in each cycle; and
(v) determining whether additional processing time is available;
building a mixed integer programming model from said daily student and resource schedules generated from said solution child nodes from said branch and bound trees, and from recurrent training requirements received from said user and said database, wherein said mixed integer programming model comprises a cost assignment of a class group and a balancing cost,
solving said mixed integer programming model to provide detailed hourly student and resource schedules at a device period level, and provide time for recurrent training, and
outputting said detailed hourly student and resource schedules for dissemination.

10. The computer storage medium of claim 9, wherein the mixed integer programming model comprises a product of a first binary variable and the cost assignment of a class group and a product of a second binary variable and the balancing costs.

11. The computer storage medium of claim 10, wherein said mixed integer programming model is expressed as:

$$\sum_{i \in I, j \in J} C_{ij} x_{ij} + \sum_{l \in L, m \in M, n \in N} C_{lmn} y_{lmn}.$$

wherein $C_{ij}$ represents the cost of assignment of a class group and $x_{ij}$ represents the first binary variable, where i represents a class group day and j represents a device period day, $C_{lmn}$ represents the balancing cost of level n for training type l in month m and $y_{lmn}$ represents the second binary variable.

12. The computer storage medium of claim 11, wherein the mixed integer programming model includes the following constraints:

$$\sum_{j \in E(i)} x_{ij} = 1; \quad \text{(ii)}$$

where $\forall\, i\,|\,i$ corresponds to a recurring training assignment, $$\sum_{i \in E(j)} x_{ij} \leq 1, \text{ where } \forall\, j; \quad \text{(iii)}$$

-continued $$\sum_{j \in P_1(i,k)} x_{ij} - \sum_{j \in P_2(i,k)} x_{ij} \leq 0, \text{ where } \forall i, \quad \text{(iv)}$$

k | CGD i needs a DPD on the following day; and $$\sum_{i \in I'} \sum_{j \in E(i)} x_{ij} \leq D_{lm} + EG_{lm} \sum_{n \in N} W_n * y_{lmn}, \forall l, m; \quad \text{(v)}$$

where $j \in E(i)$ represents a set of device period day j that can be assigned to class group day i, $i \in E(j)$ represents a set of class group day i which device period day j can serve, $j \in P_1(i,k)$ represents a set of device period day j that can be assigned to class group day i in device period k, $j \in P_2(i,k)$ represents a set of device period day j that can be assigned to the same class group represented by class group day i on the following training day in a device period k, $i \in I'$ represents a set of class group days that correspond to the first day of a recurrent training assignment, $D_{lm}$ represents a number of student groups who are due recurrent training of type l in month m, $EG_{lm}$ represents a number of student groups who are due recurrent training of type l in month m−1 but can be trained late, plus a number of pilots who are due recurrent training of type l in month m+1 but can be trained early, $n \in N$ represents a set of threshold levels, $W_n$ represents a threshold weight of level n, and $y_{lmn}$ represents a binary variable with a value of one if a threshold is reached and a value of zero otherwise.

* * * * *

UNITED STATES PATENT AND TRADEMARK OFFICE
CERTIFICATE OF CORRECTION

PATENT NO. : 8,447,646 B2  
APPLICATION NO. : 11/694414  
DATED : May 21, 2013  
INVENTOR(S) : Benjamin Glover Thengvall and Xiangtong Qi Page 1 of 1

It is certified that error appears in the above-identified patent and that said Letters Patent is hereby corrected as shown below:

In the Claims:

In column 19, line 49, claim 4 remove "$x_{ij}=1$;" and insert -- $x_{ij} \leq 1$; --, therefor.

In column 21, line 21, claim 8 remove "$x_{ij}=1$;" and insert -- $x_{ij} \leq 1$; --, therefor.

In column 22, line 61, claim 12 remove "$x_{ij}=1$;" and insert -- $x_{ij} \leq 1$; --, therefor.

Signed and Sealed this  
Twentieth Day of August, 2013

Teresa Stanek Rea  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,447,646 B2 | Page 1 of 1 |
| APPLICATION NO. | : 11/694414 | |
| DATED | : May 21, 2013 | |
| INVENTOR(S) | : Thengvall et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1578 days.

Signed and Sealed this
Sixteenth Day of December, 2014

Michelle K. Lee
*Deputy Director of the United States Patent and Trademark Office*